Dec. 6, 1949  S. GOLDEN  2,490,349
ROCKET PROJECTILE
Filed Sept. 14, 1944

Inventor
SIDNEY GOLDEN,

By C. E. Herrstrom & H. E. Thibodeau
Attorneys

Patented Dec. 6, 1949

2,490,349

UNITED STATES PATENT OFFICE 2,490,349

ROCKET PROJECTILE

Sidney Golden, Cumberland, Md., assignor to the United States of America as represented by The Secretary of War Application September 14, 1944, Serial No. 554,058

9 Claims. (Cl. 102—49)

This invention relates to an improvement in rocket propelled projectiles, more particularly to a combination trap and nozzle for such projectiles.

Many types of rockets have utilized a Venturi nozzle which is integrally formed by a swaging operation on the rear end of the rocket motor. The development of such a nozzle by swaging generally fails to produce an accurately concentric inner surface, consequently considerable machining of the inner surface of the nozzle is required. Obviously this construction and method of fabrication involves increased manufacturing costs.

Accordingly, it is an object of this invention to provide an improved design of rocket projectile which will expedite the manufacture thereof.

A particular object of this invention is to provide a rocket projectile wherein a single member defines the nozzle thereof and functions as a trap for the propellent charge.

The specific nature of this invention as well as other objects and advantages thereof will clearly appear from a description of a preferred embodiment as shown in the accompanying drawing in which.

In the design of high velocity rocket projectiles it is very important that the integrated thrust produced by the high velocity discharge of the propellent fluid does not have a resultant which is off to one side of the axis of symmetry of the rocket as the center of thrust will then be out of line with the center of mass and the flight of the rocket will be characterized by large dispersions. In this invention a jet forming member is provided which has a periphery comprising a surface of revolution that may be easily and accurately machined so that when the member is positioned centrally and concentrically within the cylindrical shell forming the motor chamber, an annular jet having symmetrically flared sides may be easily attained.

This invention is further characterized by the fact that the fins necessary for stabilizing the rocket in flight may be secured to the combustion chamber at the rear of the nozzle and may be set askew relative to the axis of the rocket so that the reaction produced by the propellent fluid on the fins will rotate the rocket in flight. The stabilizing fins, by being so disposed at the rear of the rocket motor chamber, result also in a reduction in the overall diameter of the rocket and projectile and especially permit the projector tube, from which the rocket is adapted to be fired, to be reduced in diameter.

The invention to be described in more detail later essentially comprises securing a trap member onto the end of a tube or rod mounted in the motor chamber and upon which is supported the propulsion charge. The trap member serves not only to trap the propellant charge on the rod but also cooperates with the walls of the motor chamber to define a nozzle which will have highly concentric discharge properties.

Figure 1:
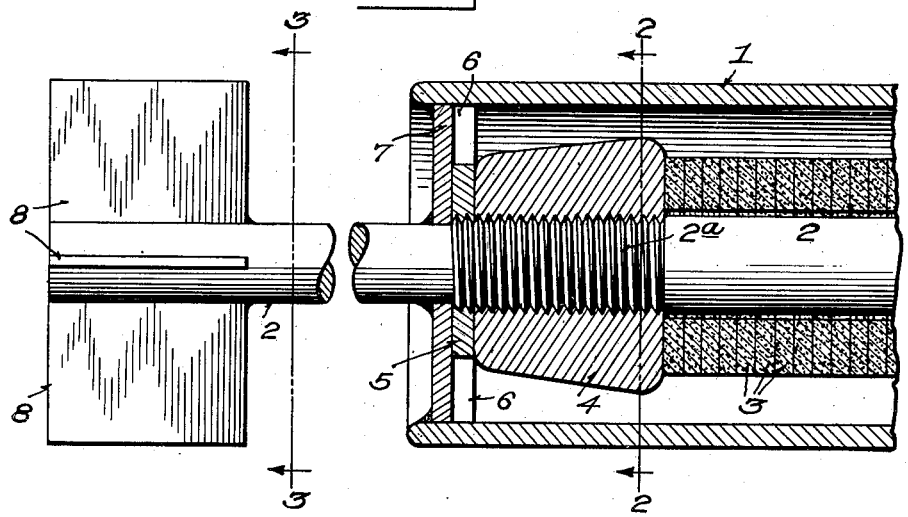
Fig. 1 is an enlarged longitudinal sectional detail view showing the combination propellant trap and nozzle.

There is shown in assembled relation in Fig. 1 a rocket projectile embodying this invention. A rocket motor housing 1 comprising a hollow cylindrical tube is provided to house the propellent charge of the rocket projectile. A rod 2 is axially mounted within rocket housing 1 and is suitably secured to the forward wall (not shown) of the housing. The housing 1 is of course secured to a suitable head containing the "pay load" in conventional manner. A propellent charge 3 preferably comprising a plurality of laminated disks of suitable combustible material to generate propellent fluid, is strung on the rod 2. An annular trap member 4 having an exterior periphery preferably of frusto-conical shape, is screwed onto an intermediate threaded portion 2a of rod 2. However trap member 4 could be formed integrally with rod 2 if desired. The shape of trap member 4 is such as to define an annular discharge nozzle opening in cooperation with the wall of housing 1. Preferably the peripheral surface of trap member 4 comprises a surface of revolution. The trap member 4 is larger than the hole in charge 3 and thus acts as a trap for such charge.

Figure 2:
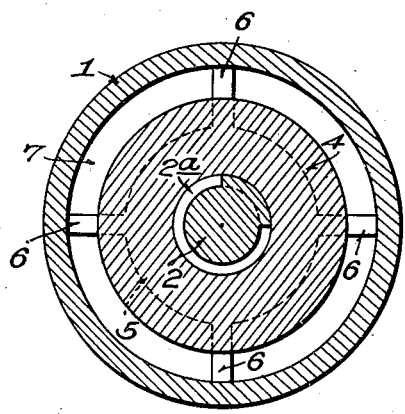
Fig. 2 is a cross-sectional view taken along the plane 2—2 of Fig. 1.
Figure 3:
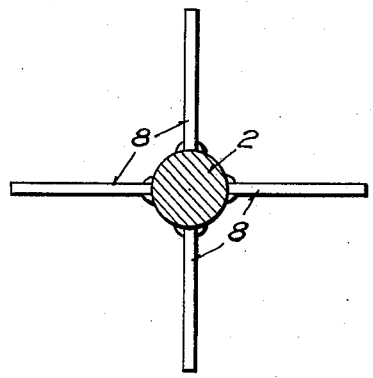
Fig. 3 is a cross-sectional view taken along the plane 3—3 of Fig. 1.

If it is desired to produce a more rigid support of the rear unsupported end of rod 2 to insure its alignment centrally and co-axially within rocket motor housing 1 a spider 5 may be provided which slips over rod 2. Arms 6 of spider 5 bear against the inner wall of rocket motor housing 1 as shown in Figs. 1 and 2 and provide necessary support for maintaining trap rod 2 co-axially within rocket motor housing 1. To prevent the entrance of moisture into rocket motor housing 1, a sealing disk 7 may be placed across the rear end of such housing and is sealed therein by a suitable cementing material such as rubber cement. On the extreme rear end of trap rod 2, a plurality of stabilizing fins 8 are secured to such trap rod as by welding. Stabilizing fins 8 will have very great stabilizing effect on the rocket projectile, and as is known in the art, such fins may be slightly skewed to produce a rotational force on the rocket projectile.

Upon ignition of propulsion charge 3 by any conventional igniter (not shown), the gas pressure built up within housing 1 readily blows out sealing disk 7. The propulsion gases flow smoothly thru the nozzle produced by trap member 4 thereby providing free, uninterrupted flow of such gases out the rear end of the housing 1. Trap member 4 secures the propulsion charge 3 on trap rod 2 until such charge is substantially consumed.

From the foregoing description it is readily apparent to those skilled in the art that a nozzle and trap combination, as illustrated in the appended drawing, is simple and cheap to manufacture. Further, such trap member serves to securely trap the propulsion charge until the burning is substantially completed and also provides uninterrupted flow of the propulsion gases out of the rocket motor. It is desired to point out however that such combination trap and nozzle member is not limited to use with a laminated charge as illustrated but is equally effective with a charge comprising a single stick of propulsion material having an axial passage for mounting on rod 2.

I claim:

1. In a rocket projectile, a hollow cylindrical motor housing of uniform thickness and radius throughout, open rearwardly with respect to the rocket projectile, a rodlike member mounted axially within the hollow portion of said housing, and a radially enlarged portion on said rodlike member, the peripheral surface of said enlarged portion being shaped to define an annular Venturi discharge nozzle opening between said enlarged portion and the interior wall of said housing, the cross-section area of said nozzle being a minimum near its forward end and a maximum near its rear end.

2. The combination defined in claim 1 wherein said peripheral surface of said enlarged portion comprises a surface of revolution.

3. In a rocket projectile, a hollow cylindrical motor housing open rearwardly with respect to the rocket projectile, a propellant charge mounted within said motor housing, a support rod mounted axially within the hollow portion of said housing and an annular member threadably secured to said support rod, the periphery of said annular member being shaped to define an annular discharge nozzle opening between said member and the interior wall of said housing.

4. The combination defined in claim 3 wherein said propellant charge has an axial hole therethru, said charge being mounted on said support rod forwardly of said annular member whereby said annular member functions as a trap for said propellant charge.

5. The combination defined in claim 3 wherein said peripheral surface of said annular member comprises a surface of revolution.

6. In a rocket projectile, a hollow cylindrical motor housing open rearwardly with respect to the rocket projectile, a propellant charge mounted within said motor housing, a support rod mounted axially within the hollow portion of said housing and having a portion extending rearwardly out of said motor housing, a radially enlarged portion on said rodlike member lying within said motor housing, the peripheral surface of said enlarged portion being shaped to define an annular discharge nozzle opening between said enlarged portion and the interior wall of said housing, and a plurality of fins secured to the said rearwardly extending portion of said support rod, whereby said fins are disposed in the discharge path of the gases generated by said propellant charge.

7. The combination defined in claim 6 wherein said propellant charge has an axial hole therethru, said charge being mounted on said rodlike member forwardly of said radially enlarged portion whereby said enlarged portion functions as a trap for said propellant charge.

8. In a rocket projectile, a hollow cylindrical motor housing open rearwardly with respect to the rocket projectile, a propellant charge mounted within said motor housing, a support rod mounted axially within the hollow portion of said housing and having a portion extending rearwardly out of said motor housing, and an annular member threadably secured to a portion of said support rod lying within said housing, the exterior of said annular member being shaped to define an annular discharge nozzle opening between said member and the interior wall of said housing.

9. The combination defined in claim 8 wherein said propellant charge has an axial hole therethru, said charge being mounted on said support rod forwardly of said annular member whereby said annular member functions as a trap for said propellant charge.

SIDNEY GOLDEN.

REFERENCES CITED

The following references are of record in the file of this patent:

UNITED STATES PATENTS

| Number | Name | Date |
|---|---|---|
| 35,977 | Roys et al. | July 22, 1862 |
| 483,126 | Bates | Sept. 27, 1892 |
| 579,035 | Bell | Mar. 16, 1897 |

FOREIGN PATENTS

| Number | Country | Date |
|---|---|---|
| 841,015 | France | Jan. 28, 1939 |